US008423302B2

(12) United States Patent
Milanes Garcia-Moreno

(10) Patent No.: US 8,423,302 B2
(45) Date of Patent: Apr. 16, 2013

(54) ELECTRONIC METHOD AND SYSTEM FOR INSTANT CREATION AND STORAGE OF CONSUMPTION HISTOGRAMS IN DRINKABLE WATER TAPPING POINTS

(76) Inventor: Fernando Milanes Garcia-Moreno, Mexico City (MX)

( * ) Notice: Subject to any disclaimer, the term of this patent is extended or adjusted under 35 U.S.C. 154(b) by 1382 days.

(21) Appl. No.: 10/472,222

(22) PCT Filed: Mar. 22, 2002

(86) PCT No.: PCT/IB02/00885
§ 371 (c)(1),
(2), (4) Date: May 28, 2004

(87) PCT Pub. No.: WO02/077581
PCT Pub. Date: Oct. 3, 2002

(65) Prior Publication Data
US 2004/0199477 A1    Oct. 7, 2004

(30) Foreign Application Priority Data
Mar. 22, 2001   (MX) ............... PA/a/2001/002993

(51) Int. Cl.
*G01F 1/00* (2006.01)
(52) U.S. Cl.
USPC ............................................. 702/45; 73/861
(58) Field of Classification Search ............... 73/861.77, 73/861.78, 861.79, 861; 705/412, 413, 418, 705/30, 32; 210/87; 340/870.03, 870.06, 340/870.11, 870.02; 235/487; 702/45, 50; 137/624.11, 624.12
See application file for complete search history.

(56) References Cited

U.S. PATENT DOCUMENTS

| 3,820,073 | A | * | 6/1974 | Vercellotti et al. ....... 340/870.03 |
| 4,075,560 | A | * | 2/1978 | Stifter ......................... 324/131 |
| 4,253,341 | A | * | 3/1981 | Ikeda et al. ................ 73/861.77 |
| 4,285,245 | A | * | 8/1981 | Kennedy ........................ 73/861 |
| 4,306,457 | A | * | 12/1981 | Fukui et al. ................ 73/861.77 |
| 4,387,296 | A | * | 6/1983 | Newell et al. ................. 235/376 |
| 4,495,596 | A | * | 1/1985 | Sciulli ............................ 714/14 |
| 4,777,354 | A | * | 10/1988 | Thomas ....................... 235/380 |
| 4,803,632 | A | * | 2/1989 | Frew et al. .................... 705/412 |

(Continued)

FOREIGN PATENT DOCUMENTS
WO       WO 00/03209          1/2000

*Primary Examiner* — Igor Borissov
(74) *Attorney, Agent, or Firm* — Roylance, Abrams, Berdo & Goodman, L.L.P.

(57) ABSTRACT

The invention herein is referred to the technical field of measuring and consumption control systems of water. The invention can be installed in a meter that provides the media and signals necessary for its interconnection. The System of the invention herein comprises a Micro-controller devise, therefore, the actions that it carries out can be modified according to the requirements of each agency that supplies drinkable water. Each pulse emitted by the meter, is sensed by the System of the invention; concurrently, a real time clock allows the measurement of the difference of timetables between pulses to obtain the real instant flow rate, in order to increase, later, one of the volume counters that correspond to the consumption recorded within the preset instant flow rate ranges, same that, jointly, will comprise a consumption flow rate histogram. The pulse sensed by the invention increases at its time a counter of a group, depending on the hour of the day when it was generated, to make up a timetable histogram. The information of the counters resident in the memory can be read electronically by wired or wireless media.

7 Claims, 7 Drawing Sheets

U.S. PATENT DOCUMENTS

Figure 1:
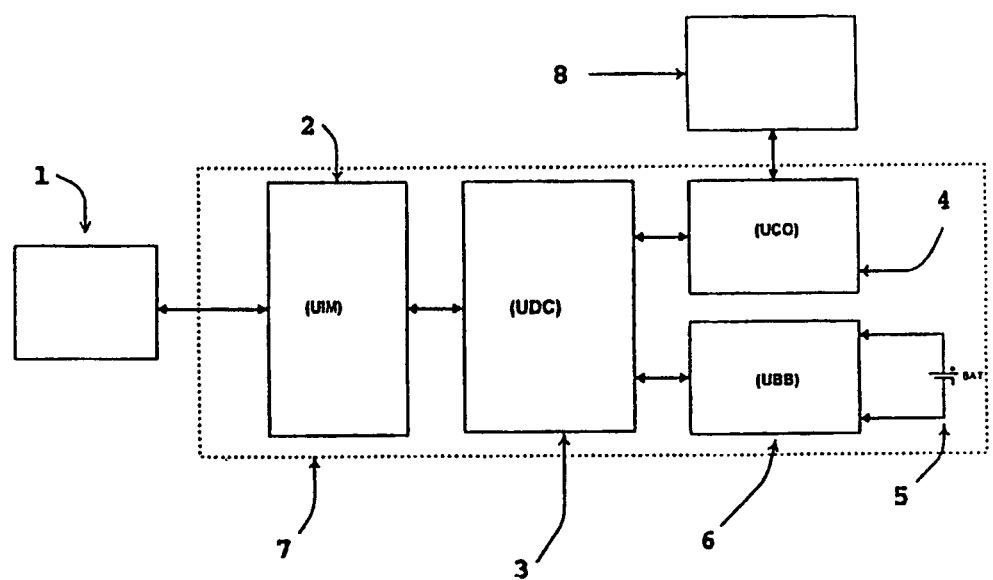

| | | | |
|---|---|---|---|
| 4,888,702 A * | 12/1989 | Gerken et al. | 700/295 |
| 4,940,976 A * | 7/1990 | Gastouniotis et al. | 340/870.02 |
| 5,216,623 A | 6/1993 | Barrett et al. | |
| 5,404,136 A | 4/1995 | Marsden | |
| 5,574,229 A * | 11/1996 | Castillo | 73/861.78 |
| 5,635,895 A * | 6/1997 | Murr | 340/538.11 |
| 5,721,383 A | 2/1998 | Franklin et al. | |
| 5,767,790 A * | 6/1998 | Jovellana | 340/870.02 |
| 5,811,675 A * | 9/1998 | Hamer | 73/198 |
| 5,866,824 A | 2/1999 | Schieber | |
| 5,963,146 A * | 10/1999 | Johnson et al. | 340/870.01 |
| 6,216,726 B1 * | 4/2001 | Brown et al. | 137/486 |
| 6,470,903 B2 * | 10/2002 | Reyman | 137/1 |
| 2001/0003286 A1 * | 6/2001 | Philippbar et al. | 137/624.12 |

* cited by examiner

ELECTRONIC METHOD AND SYSTEM FOR INSTANT CREATION AND STORAGE OF CONSUMPTION HISTOGRAMS IN DRINKABLE WATER TAPPING POINTS

FIELD OF THE INVENTION

The invention herein is referred to the technical field of the measuring and supply control systems of drinkable water.

BACKGROUND

In general, private and government agencies-responsible for the supply of drinkable water, use mechanical measuring instruments to establish the bills they make to the consumers for the service rendered; as the performance of the meter is reduced when its components are worn, there are maintenance policies set in base to the total volume recorded, or the time elapsed since its installation.

The wearing of the measuring equipment is not only a function of the volume recorded and the quality of water; but particularly of the instant flow rates at which such volume goes through the meter. Efficiency is not only a function of the meter's accuracy, but of the proportion of volume that according to the characteristic consumption pattern of each consumer, is measured with the specific accuracy of the device at each instant flow rates of consumption.

Having a histogram of the instant flow rates of real consumption that a meter in service has been subject to, would allow to optimize the useful life of the devices in such way, that it is repaired or replaced at the most adequate and economic time for the water utility, taking into consideration both the relative income and investments; it would also be useful to ensure the right sizing and measuring technology.

On the other hand, an important element to consider in the supply of drinkable water, is the distribution of the demand throughout the day, as the infrastructure and operation are planned to be able to offer a good service in the peak hour of the day of peak demand. This has as a consequence the "sub-utilization" of the installed capacity during most of the year, and the need to increase such capacity, with the same criteria, at the slightest increase in population or demand.

It would be very useful for the water utility, to know the consumption volumes taking place during different periods of the day, so that besides providing elements for a better planning of the infrastructure and operation, it would allow to set different tariffs for different consumption times, as is the case of the telephone and electric power companies. That could introduce, via price, a modification of the demand that contributes to make the operation more efficient, and to take advantage of the existent infrastructure, even to the point of differing investments.

The case of the companies that render services supplying electrical power is well known, regarding that they have set programs of incentives and penalties to their greater consumers with the purpose of keeping their distribution networks with the optimal dimensions and not incur in unnecessary investments. The programs set have as an objective to distribute the demand, keeping a sound average of consumption during the day, and ensure that the power transported is consumed efficiently by the consumer.

Normally, the consumption of electrical power required for the distribution of water represents one of the major operative expenses of water utilities, and these are usually considered as great consumers. Then, it is necessary that water utilities control their consumption of electrical power, difficult task to set if the consumers have a completely different consumption behavior during the day to the one that is more convenient for the agency. To be able to charge for the service with tariffs based on time-of-use, would, therefore, help to link the consumption of water of the users to the times-of-use that are more convenient to utilities from the energy costs point of view.

Another element to consider, regarding the profitability of the water utilities, is the productivity and reliability of the methods employed to read the consumption of users with which the billing and collection processes start.

Several technologies of electronic reading have been developed up to date, which are available in the market, and offer great benefits; nevertheless, for many water utilities the cost-benefit relation of its implementation does not justify them yet.

There is currently a considerable number of devices that in the technical field referred to by the invention herein, carry out functions of electronic reading of the total volume consumed; nevertheless, they offer little additional information.

An electronic reading system that besides recording the total volume consumed, provides details of the instant flow rate and time-of-use would result on a very useful tool to obtain the aforementioned benefits.

On the other hand, there are equipments that allow the gathering of data for the sizing of distribution networks, obtaining (of) consumption profiles and selection of measuring equipment, nevertheless, these are used in selected points and zones and during short periods of time that may not even be representative, and besides their cost is very high.

To intend to apply these technologies to analyze the behavior of all consumers would require, besides huge investments, transmission channels with high bandwidth due to the big amount of data generated, or very long and non practical reading times.

One of the objectives of the present invention is to offer an electronic reading system for drinkable water tapping points that provides, besides the total volume consumed by the user, profiles of the instant flow rates of consumption and the periods of the day when this happens, through the use of a mechanical water meter equipped with pulse emitters.

Another objective of this invention is to provide such information in a compact way, so that it allows a quick and practical transmission, in a device that will have years of autonomy and that is adequate even for adverse installation conditions.

Another objective is to provide the water utilities with elements to make of their activity a more profitable one, through better informed programs for the maintenance of meters, a better use of the installed capacity, an efficient distribution of the supply throughout the day and even for differing investments.

Another objective of this invention, is to provide water utilities with information that allows them to estimate, from known errors inherent to the accuracy of mechanical meters at different instant flow rates, the volume of water that is currently considered as a physical loss, and even to compensate individual billing, inferring the supplied water not measured.

Another of the objectives of this invention is to provide water utilities operator with means that allows them to apply tariff schemes that are more creative, oriented to the efficient and sustainable use of drinkable water.

The System of this invention comprises a Micro-controller device that allows to modify the actions carried out, according to the requirements of the market or special needs of the operator.

The invention can be installed in a meter that provides the media and signals necessary for its interconnection, of which there are standards that many manufacturers have adopted.

The water flow is registered by the meter, which, each time it registers certain volume, emits a signal that is coupled to the circuitry of the System.

Each pulse emitted by the meter is sensed by the System of the present invention, and acts as a reference to measure the volume consumed and the difference of time between the occurrence of pulses is used to determine the flow rate. When each pulse occurs, the invention "wakes up" from a sleep state in which it normally is in to optimize the use of the power source and therefore extend its autonomy or useful life. For the present case, it is used, for example a Power Unit (BAT) (5) of lithium as source, as it will offer the system a useful life that can be higher than the one of the meter to which it has been interconnected.

The invention has a group of resident counters in a non-volatile memory. Within this group of counters, each represents the volume consumed within a flow rate range. When the invention determines the time elapsed between the last two pulses, it calculates the flow rate and will select within a range table which volume counter has to increase. With this, an "histogram" of frequency is obtained; this histogram shows the amount of volume that has been consumed within each preset interval of instant flow rate.

Concurrently, a real time clock which is an element contained in the present invention, is used to select among other group of counters, the one that corresponds to the period of the day when the pulse from the meter has been detected. With this, it is obtained a "histogram" of usage time which indicates the frequency of the volume consumed in the different time-of-use intervals assigned to each counter of the group, previously set.

As the meters may be installed on the street, for this case, the physical installation of the invention would be carried out in this same environment. Therefore, the invention provides the media to detect vandalism or fraud attempts intents and register them in its memory.

The information stored in the invention's memory, can be accessed through a serial communication medium (wired or wireless) and configured through these same media.

With the purpose to adequately illustrate the present invention we are attaching to the present specification several figures that are described as follows.

FIG. 1. Shows in general form the blocks of major elements of the invention.

Figure 2:
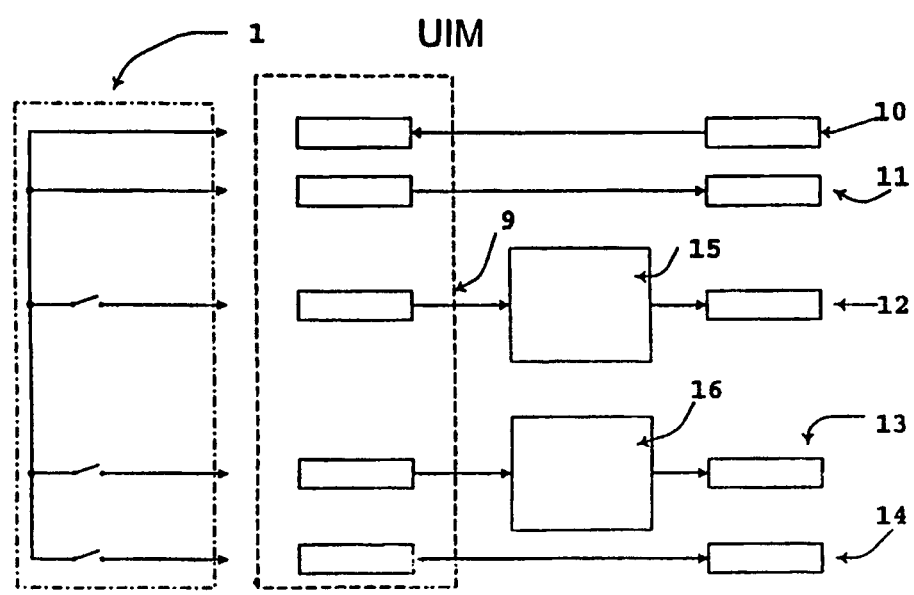

FIG. 2. Shows in detail the Meter Interface Unit (UIM) (2).

Figure 3:
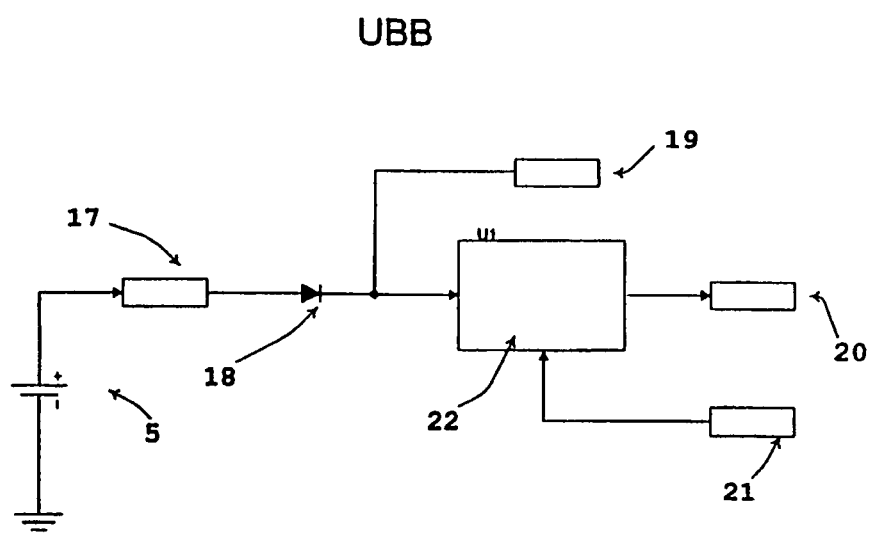

FIG. 3. Shows the Unit of Protection and Detection of Power (UBB) (6)

Figure 4:
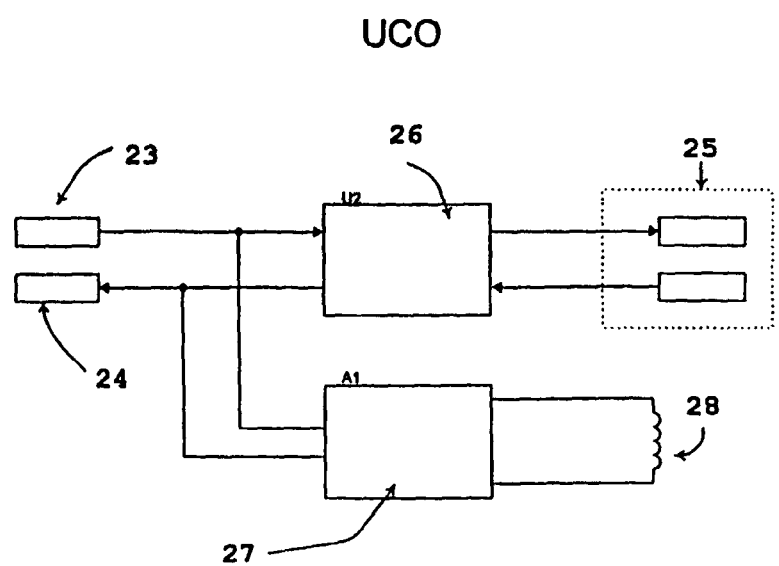

FIG. 4. Makes reference to a simplified description of the Communication Unit (UCO) (4)

Figure 5:
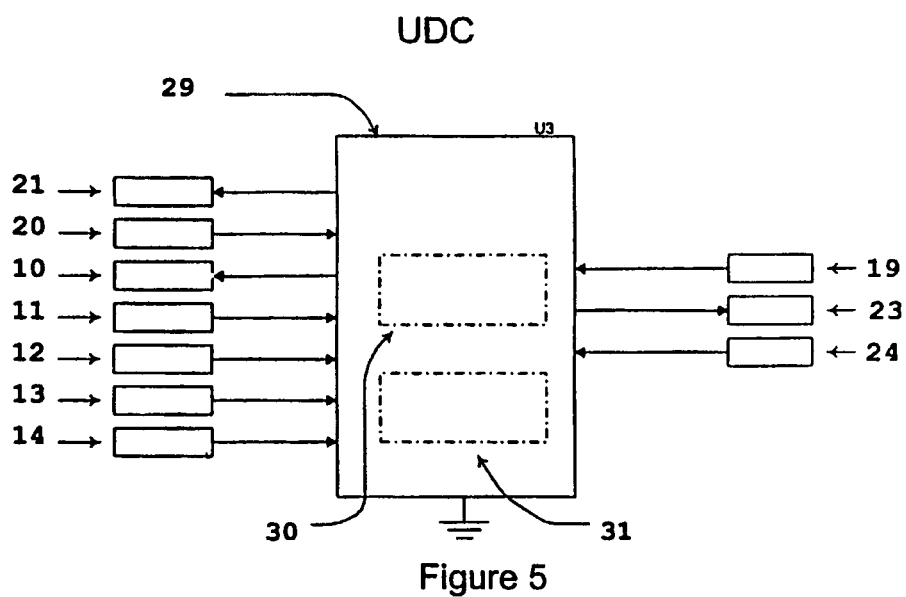

FIG. 5. Describes the assignation of signals in the Control Unit (UDC)

Figure 6:
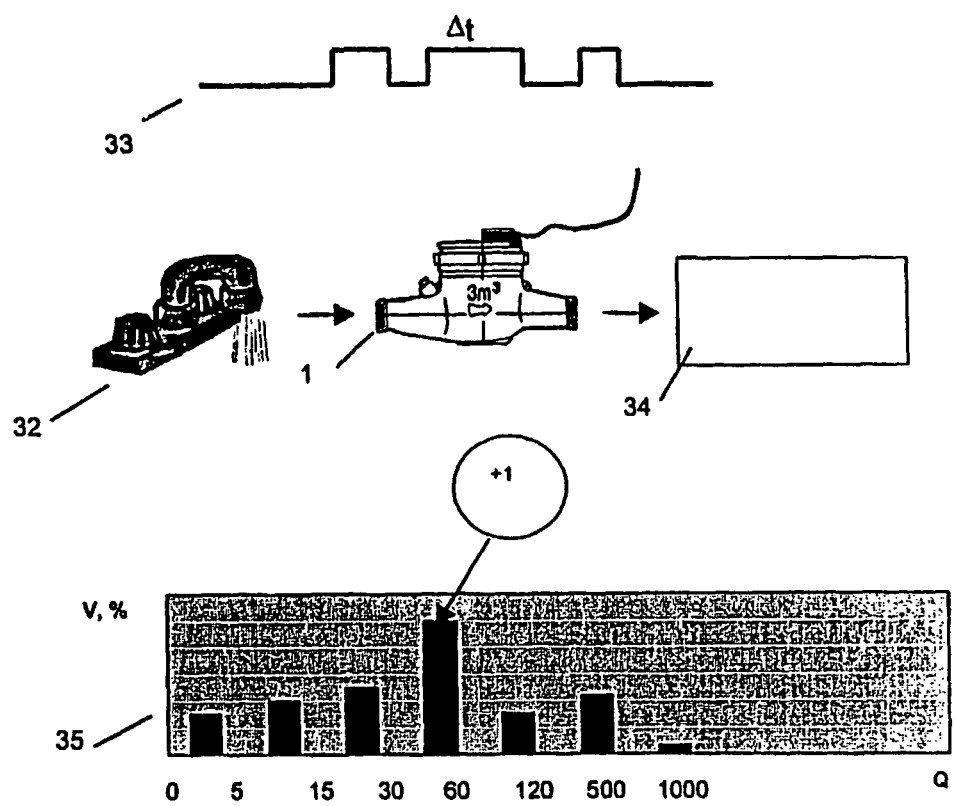

FIG. 6. Shows an example of instant creation of consumption histograms.

Figure 7:
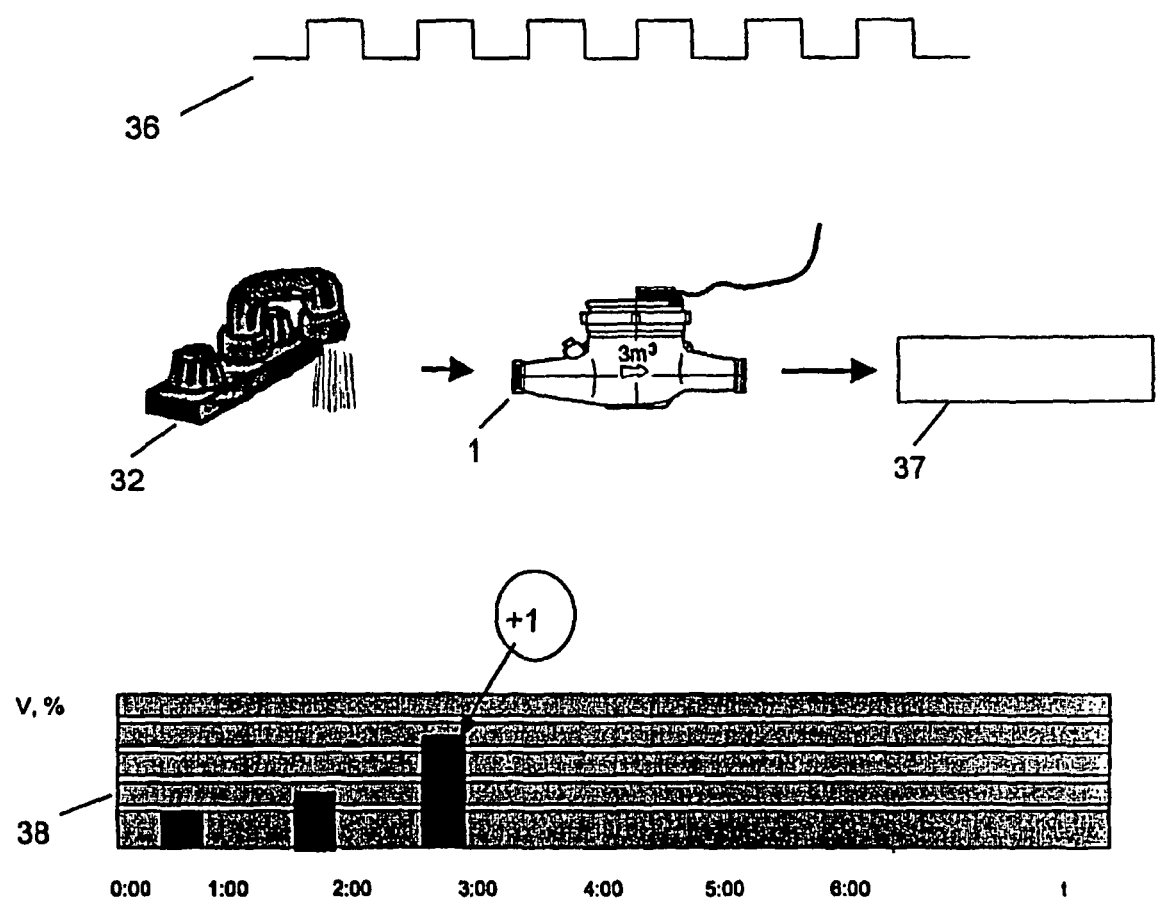

FIG. 7. Shows an example of creation of consumption time-of-use histograms.

DETAILED DESCRIPTION

The invention is shown in general form in FIG. 1. The connection to the water meter (1) is carried out through the Meter Interface Unit (UIM) (2). All circuitry of the invention is contained in a sealed cabinet (7) that protects it from environmental humidity, of possible immersions due to flooding and unwanted human intrusion.

The invention is (composed) formed by a Control Unit (UDC) (3) that carries out measurements and calculations. The necessary communication for the configuration programming and reading is carried out though the Communication Unit (UCO) (4) with the use of a Portable Terminal or Personal Computer TP/PC (8). The invention gets its power from a Power Unit (BAT) (5) which is connected to the Unit of Protection and Detection of Power (UBB) (6), in charge of monitoring the available power level to operate and prevent polarity inversion at the Power Unit (BAT) (5).

The Meter Interface Unit (UIM) (2) is shown in FIG. 2; its function is to condition and filter the signals from the meter (1) coupled through a cable (9) in a straight line to the Control Unit (UDC) (3) (signals 10, 11, and 14). The low pass filters (15) and (16) (and) eliminate possible noises and rebound present in the flow signals that come from the meter.

The Control Unit (UDC) (3) shown in FIG. 5, comprises a Micro-controller (29), that has a non volatile memory (30) to store parameters and a real time clock (31) that maintains a base of stable time. The UDC couples to the rest of the units of the invention through input and output signals regarding (29).

The Communication Unit (UCO) (4) shown in general form in FIG. 4), turns the communication lines (23) and (24) into signals that can be transmitted to an external terminal device (8), either by a wired media coupled by means of the signals (25), through the converter (26) or a wireless channel by means of the converter (27), which in turns couples the signals from and towards the system through an antenna (28).

The Unit of Protection and Detection of Power (UBB) (6) is shown in FIG. 3, it comprises a Shotky diode (18) that connects to the Power Unit (BAT) (5) by means of a signal (17) to the feeding voltage signal of the invention (19) as well to a voltage detector (22), used to indicate the level of use of the Power Unit (BAT) (5) to the Control Unit (UDC) (3) by means of the signals (20) and (21).

Connection to the Meter. The invention allows the connection of several signals with multiple configurations. According with one of the embodiments of this invention, the typical configuration of signaling between the meter (1) and the invention's System has been shown, which is illustrated in FIG. 2 by a cable (9) which is, at the same time, connected to the Control Unit (UDC) (3) through electrical signals.

By means of the signaling provided by (1), it is possible to control, through signal (10), the presence of current in the pulse generator of (1). The pulse generator contained in (1), provides enough information to the Control Unit (UDC) (3) to detect a cutting in the cable through the signal M_CORTE (11). The meter also generates pulses for each volume unit that flows through the signal S_FLUJO, that in turn is filtered by means of the low pass filter (15) to eliminate noises that could provoke false readings in (3).

The filtered signal is acquired by the Control Unit (UDC) (3) through the signal S_FLUJO (12). The detector of magnetic violation that is in (1) is activated with the presence of an intruder magnetic field and is coupled to the Control Unit (UDC) (3) by means of signal C_VIOLA (14). As an additional safety level, some meters such as (1) add the media to be able to detect the inverse flow through a back flow detector. The signal S_REFLUJO is also filtered by means of (16) to generate the clean signal M_REFLUJO (13). Signal (13) will activate the Control Unit (DC) (3) when the direction of water flow goes from inside the consumer's installation towards the user premises. Depending on the criterion of the operator, this situation may indicate a fraud or the generated information may be used to discount from the total volume consumption by the user, the volume that has returned to the operator.

The Control Unit (UDC) (3) shown with further detail in FIG. 5, is kept under a sleep state to minimizes energy consumption. To lessen the drainage of power of the Power Unit (BAT (5) in case that the detectors of flow, back flow and violation are kept active, the signal C_CTLU1M (10) deactivates the feeding voltage and introduces to the Control Unit (UDC) (3) in a special mode of operation where it monitors the signals (12, 13 and 14) until they show activity again.

Data retrieval and processing. According to this invention, it is possible to carry out information processing to create what is identified in the present application as a "Flow Rate Histogram" and a "Time-of-Use Histogram". Both entities comprise two structures of independent data that reside in the non volatile memory (30) and within said Histograms there is a group of records that store the limits of the flow rate class and time usage intervals, which we will call "flow rate interval" and "time-of-use interval". One characteristic of this invention is, that the water utility has the possibility of programming the values of the limits that correspond to the class intervals by means of (8). Each class interval of both histograms have a registry associated, that operates as a counter where the frequency or amount of events that have occurred within the limits of each interval are stored.

For each histogram, there are "n" frequency counters and "n" class intervals that are bounded by 2*n limits of the class intervals. The "n" amount will depend on the capabilities of the non volatile memory (30) of the Micro-controller device (29) used. Likewise, the amount of frequency counters of the two histograms may be different.

Only with illustration purposes of the operation of the present invention, an example of the implementation of the System where the flow rate histogram will be comprised by 10 flow rate intervals with the respective 20 limits of interval (s) is described. The time usage histogram will be comprised by 6 timetable intervals with 3 frequency counters.

The retrieval and processing of data is carried out when the signal (12) activates the Micro-controller (29) that is under sleep state. Because concurrently the real time clock (31) contained in (29) provides a time basis, the Micro-controller (29) can measure the difference of times between the pulse that has just occurred in the signal (12) and the immediately previous pulse occurred in the same signal. As the instant flow rate (Q) can be expressed as volume per unit of time (Q=V/t), and as each pulse represent one known volume unit, the difference of time between the pulses allows to infer the instant flow rate of the flow of water by the meter. The application program that is executing within (29) analyses the value of time measured between pulses, which we will call Tq, to see to which of the 10 flow rate intervals it corresponds. This is done comparing if the value of Tq is within each of the 10 pairs of limits corresponding to each interval. Once determined to which interval it corresponds, the frequency counter associated to such interval is increased by the application program. The frequency counters will form the histogram that will represent the instant flow rate profile of the consumer where the volume consumed by such user within each flow rate interval as well as the total of volume consumed is shown, which can be calculated carrying out the sum of the 10 frequency counters. By means of (8), the operator can read the information of the 10 counters and to process such information in its facilities so that the result of such analysis allows him to know the consumed volume by the consumer to carry out the billing, make decisions about the possible mistake compensations in the measurement applicable to that billing, and determine the wearing that the meter has had the meter (1).

Simultaneously to the generation of the flow rate histogram, the application program in (29) obtains the hour of the day that is provided by the real time clock (31) and analyzes such value to see to which of the 3 timetable intervals of the time usage histogram corresponds. This is done comparing if the value of the hour is within each one of the 3 pairs of limits corresponding to each timetable interval. After determining the interval, the application program in (29) increases the time usage frequency counter associated to such interval.

FIG. 6 is an illustration of the instant creation of consumption histograms; in that figure, the (32) represents a source of water consumption that in this case corresponds to a bathroom handles and (1) to a water meter, the (33) identifies a pulse graphic of different length, generated by the meter (1), the (34) refers to an expression represented in the following form:

$$\frac{\text{Pulse}}{\Delta t} = X \text{ lt/hr}$$

The (35) corresponds to a graphic of % of volume against flow rate, the latter having preset intervals. The consumption histogram is created when the meter (1) generates a pulse each time a determined volume of water passes through it; knowing the time elapsed between pulses, we can estimate the instant flow rate to which that volume was consumed. The value thus calculated, is compared with the limits of the preset instant flow rate ranges, to increase the totalizer associated to the corresponding range.

In the example of FIG. 6, if X is higher than 30, but equal or lower than 60, it means that the flow rate shall be between the 30 and 60 intervals, therefore, as shown in graphic 35, it is within this interval where the corresponding consumed volume is added.

According to FIG. 7, we have an example of creation of consumption time-of-use histograms; as well as in FIG. 6, (32) represents a source of water consumption, that in this case corresponds to a bathroom handle and (1) to a water meter, (36) identifies a graphic of pulses generated by the meter (1) at different times of the day, (37) corresponds to an expression that is read as "Pulse at X hours", and (38) shows a graphic of % in volume against time. The consumption timetable histogram is created when the meter (1) generates a pulse each time that a determined water volume passes through it; knowing the hour of the day when it is recorded, this is compared with the limits of the preset timetable ranges, to increase the totalizer associated to the corresponding range, regardless the instant flow rate it was consumed to. For example, if in the previous case X is higher than 02:00 but equal or lower than 03:00 hours, then the totalizer associated to this interval will increase, as shown in the graphic (38).

The previous action allows us to obtain a histogram of time-of-use where the class intervals represent the periods of the day, and the frequency or value of each counter represents the consumed volume in such timetable range. Just as with the instant flow rate histogram, the 3 counters can be accessed by (8) to carry out a time-of-use billing that allows the utility make a more efficient use of its resources through the application of tariffs associated to each timetable interval that promote or discourage the consumption in such timetable intervals.

According to another aspect of the system of the present invention, the occurrence of the signal (13) that indicates an back flow in the meter (1) can be used to generate a data structure histogram type, similar to the one previously described, or increase a sole counter resident in (30) that can be read by (8) to penalize or compensate later the consumer, depending on the administrative policies of the operator.

As it was mentioned, each time that a pulse is present in signals (12) and (13), the Micro-controller (29) within the Control Unit (UDC) (3) is activated and carries out the described processes. The purpose of keeping "off" the Micro-controller (29) is to maintain a low consumption of energy, as the actions are carried out by (29) in a very short time, keeping the average current drained from the Power Unit (BAT) (5) in a level of a millionth of Amperes. The low consumption of power is optimized furthermore, selecting the correct Micro-controller (29). For the case of the present invention, it can be implemented using a Microchip Technology PIC16LC558, but other devices may be used, such as the MSP430-112 from Texas Instruments. Most of these devices are excited with crystals of very low frequency as 32,768 Hz that maintain an operation current in very low levels and an accurate time basis.

Depending on the characteristics of the Micro-controller (29) used, the measurement of elapsed time can be carried out by the same Micro-controller (29) in an internal way, building with code what is known as a Real Time Clock (31). The purpose of this element is to maintain concurrently a time basis that allows to carry out the measurements of the flow rate and to maintain a clock that shows the hour of the day for the timetable measurement. The setup of the Real Time Clock (31) can be carried out with external electronics to (29) using components such as the PCF8583P of Phillips.

It is important to mention that the explanation of the functioning of this invention has been limited only to a type of application to illustrate its operation, nevertheless, the programmable nature of the Micro-controllers such as (29) allows the System to operate with different behaviors and adjust even in field to the needs of the market, water utility or individuals.

Detection of Low Power. The Control Unit (UDC) (3) may know the power level available at the Power Unit (BAT) (5) by means of the low Unit of Protection and Detection of Power (UBB) (6). The circuit shown in FIG. 3, obtains the voltage of the Power Unit (BAT) (5), present in signal S_VBAT (17) that is in turn connected to the signal VCC (19) by means of a Shotky diode (18), used to protect the system of an inverse polarity. The typical voltage of application is 3 Volts, reason why a Lithium (5) Power Unit (BAT) of 3.6V with 2.1 Amperes-hour capacity is used.

To implement this invention, the amount of power stored in the Power Unit (BAT) (5) is enough to keep all the system operating for an average time of 6 years. Nevertheless, the battery may be easily replaced once it is drained off.

The Micro-controller (29) activates the signal C_LOWB (21) placing a level of zero logical each time the application program resident in the ROM decides so. The previous action turns on the voltage detector (22) which compares internally the value of the signal VCC (19) with an internal reference. If the voltage level detected is lower than 2.7V, the signal M_LOWB (20) will change of state, indicating the Control Unit (UDC) (3) that the useful life of the Power Unit (BAT) (5) has ended. The detector of the low Power Unit (BAT) (5) that can be used for this invention is MN-13811-G 25 of Panasonic.

The actions to follow after detecting a low Power Unit (BAT (5) are determined in the application program, but shall include an update of a record stored in the non-volatile memory (30), which may contain other accidental events such as a magnetic violation detected by the signal (14), or a cutting of the interconnection cable to the meter (1) by means of signal (11).

The information in this record may be accessed by means of the Communication Unit (UCO) (4).

Reading and Configuration. The water utility uses the Communication Unit (UCO) (4) as the means to transfer information between the invention and a Portable Terminal or Personal Computer TP/PC (8). The information is transferred by a safe communication protocol, and may be carried out wired, connecting a serial port RS-232C to the connector (25) shown in FIG. 4.

The communication signals present in (25), are adapted to a level of the voltage that the Control Unit (UDC) (3) can manage. The previous action is carried out by means of the converter (26) that has been implemented using a semiconductor that may be the DS275 of Dallas Semiconductor. The built-in circuit (26) uses the available power in the signals present in (25) to carry out the conversion so that the power required for the serial communication is taken from the Portable Terminal or Personal Computer TP/PC (8).

Furthermore, the communication can be carried out without having to make a physical contact, using a Portable Terminal or Personal Computer TP/PC (8) with an inductive transmitter-receiver. If this is the case, the communication is carried out by means of the antenna (28) and the signals are adapted and conditioned by means of the inductive converter (27). The wireless communication is carried out modulating the data signals with a high frequency signal that is "coupled" to the antenna formed by a coil (28). For this invention, a module supplied by Fusion Meter LTD Company or Hexagram Inc. may be used.

Another communication method can be transmitting data signals via radio frequency or telephonic modem. For these types of schemes, integrated modules of radio, such as TR1000 of RF Monolithics Inc. Company can be used; this one operates in the range of 900 Mhz with power levels enough for distance ranges of about 100 meters.

By any of the communication media used, a change on the state of signal M_RXD (24) is detected by the Micro-controller (29) within the Control Unit (UDC) (3). If the Micro-controller (29) was slept, it "wakes up" and will start to receive the information from the external device.

The information transference is ruled by a password which verifies the validity of access; this is necessary to avoid possible unauthorized accesses. Once a valid access is detected, the application program residing at the Portable Terminal or Personal Computer TP/PC (8) may access the Micro-controller's memory (29) to read and write its contents. By means of reading, the Portable Terminal or Personal Computer TP/PC (8) may transfer the contents of the account records or histograms that contain information about the volume that the user has consumed and the profile of flow rates and time-of-use. Similarly, the water utility has access to the information about the status of the System, this information may show back flow levels, magnetic violation attempts, cuttings in the sensor's cable (9) and interconnected to the meter (1). The information stored in the non-volatile memory (30) is converted to a serial format and transferred by means of the signal C_TXD (23) towards the interface of the connector (25) or towards the antenna (28) that may be of inductive transmission, radio frequency or any other method of wireless transmission according to the case.

On the other hand, the water utility may configure or program the operation of the invention, transferring new values to the non-volatile memory (30). The new values will rule the behavior of the application program residing in the Micro-controller's ROM (29) and can be the values of class intervals of flow rates and timetables or initialization of the Real time Clock (31) (may be levels), just to mention some of them.

The invention, therefore, provides a System for reading in an electronic way of the information of billing and statistics, generated by the water meter (1) using the available communication media.

The invention claimed is:

1. An electronic system and assembly adapted for instantly and continuously creating, updating and storing flowrate histograms and time-of-use histograms of water consumption in situ without the need for any external auxiliary computing system, at a water outlet from a water pipeline, and for providing a profile on how water has been used during a lapsed service life of a water meter, said system and assembly comprising:

a Meter Interface Unit (UIM) connected to the water meter (1) for conditioning and filtering pulses produced by the water meter, each of said pulses corresponding to a predetermined unit volume of water passing through the water meter;

a control unit (3) connected to the water meter for making measurements and calculations using the pulses and for generating histograms of water consumption, said control unit configure to:

receive the pulses from said water meter, measure the length of time between each of the pulses and determine an instantaneous flow rate of a corresponding volume of water passing through the water meter, and increase by one unit a frequency counter associated with a corresponding pre-set flowrate range of a plurality of pre-set flow rate ranges, every time a pulse is received, and to create a lapsed service life flowrate histogram of the meter; and determine the time of day that each pulse is received and increase a volume frequency counter associated with a corresponding predetermined time of day range of a plurality of time of day ranges by one unit volume by adding to the number of pulses received in previous days in each predetermined time of day range, and create a lapsed service life time-of-use histogram of the meter;

wherein the resulting flow rate histogram and time-of-use histogram are independent data series of values stored in a memory of said control unit, said control unit having previously been programmed with the limits of flow-rate and time-of-use intervals, said flow rate and time-of use intervals having each an associated register acting as a counter for storing the amount of pulses that occurred within each said interval.

2. The system in claim 1, wherein said control unit is configured to determine the total volume of water measured during the lapsed service life of the meter by the sum of "n" pulses of either histogram.

3. The system in claim 1, in which said control unit has a memory capacity to create, update and store said histograms of consumption throughout the service life of the meter.

4. The system in claim 1, wherein said control unit is configured to determine lapsed service life histograms of consumption by retrieving an independent series of frequency counters associated with the flow rate histogram and time of use histogram without further external data processing.

5. The system in claim 1, wherein interval limits of said histograms of consumption are configurable by a Utility.

6. An electronic system and assembly configured to instantaneously and continuously create, update and store histograms of water consumption at a water outlet from a water pipeline in situ to produce a profile of how water is consumed during a lapsed service life of a meter, without the need for an auxiliary computing system, said system comprising:

a Meter Interface Unit (UIM) connected to a water meter for receiving pulses from a water meter adapted for producing pulses corresponding to a predetermined unit volume of water and conditioning and filtering the pulses;

a control unit configured to receive said pulses from said meter interface unit and water meter, said control unit configured to calculate a number of pulses received within each of a plurality of predetermined time intervals during each day for a number of days and to calculate a water consumption histogram based on the total number of pulses within each predetermined time interval for said number of days corresponding to the total volume of water consumed during each of said time intervals;

said control unit further configured to continuously calculate a flow rate histogram by measuring the time lapse between each of said pulses and calculate a flow rate measurement between each pulse and to accumulate a total number of water volume units for each of a plurality of predetermined flow rate ranges to produce said flow rate histogram, and said control unit having a memory unit for storing said time of use histogram and said flow rate histogram.

7. An electronic system and apparatus configured to instantaneously and continuously create, update and store histograms of water consumption at a water outlet, said system comprising:

a meter interface unit connected to a water meter, said water meter producing a pulse corresponding to a volume unit of water, said meter interface unit configured to receive said pulses and filter and condition said pulses; and a control unit configured for receiving said pulses from said meter interface unit, said control unit having a counter corresponding to each of a plurality of predetermined time intervals during the day, each said counter configured to continuously count the number of pulses received during each corresponding predetermined time interval for a number of days and to produce a time of use histogram corresponding to the total volume of water consumed during each of said predetermined time intervals over said number of days, and to determine the total volume of water consumed over said number of days, said control unit further configured to continuously measure the time lapse between each pulse and determine the flow rate for each volume unit passing through the water meter, said control unit having a frequency counter corresponding to each of a plurality of predetermined flow rate ranges, each said counter configured for counting said volume units flowing at a flow rate value within the respective predetermined flow rate range, over said number of days, and to produce a flow rate of use histogram based on the total volume units of water flowing within said flow rate ranges over said number of days; and a memory unit for storing said time of use of histogram and flow rate of use histogram.

* * * * *